March 23, 1954

W. S. DRUZ

TIMING SYSTEM FOR SUBSCRIPTION TYPE TELEVISION RECEIVERS 2,673,238

Filed May 20, 1950

2 Sheets-Sheet 1

WALTER S. DRUZ.
INVENTOR.

BY Francis W. Crotty
HIS ATTORNEY

March 23, 1954

W. S. DRUZ

TIMING SYSTEM FOR SUBSCRIPTION
TYPE TELEVISION RECEIVERS 2,673,238

Filed May 20, 1950

2 Sheets-Sheet 2

WALTER S. DRUZ.
*INVENTOR.*

BY Francis W. Crotty

HIS ATTORNEY

Patented Mar. 23, 1954

2,673,238

UNITED STATES PATENT OFFICE 2,673,238

TIMING SYSTEM FOR SUBSCRIPTION TYPE TELEVISION RECEIVERS

Walter S. Druz, Chicago, Ill., assignor to Zenith Radio Corporation, a corporation of Illinois Application May 20, 1950, Serial No. 163,223

4 Claims. (Cl. 178—5.1)

Figure 1:
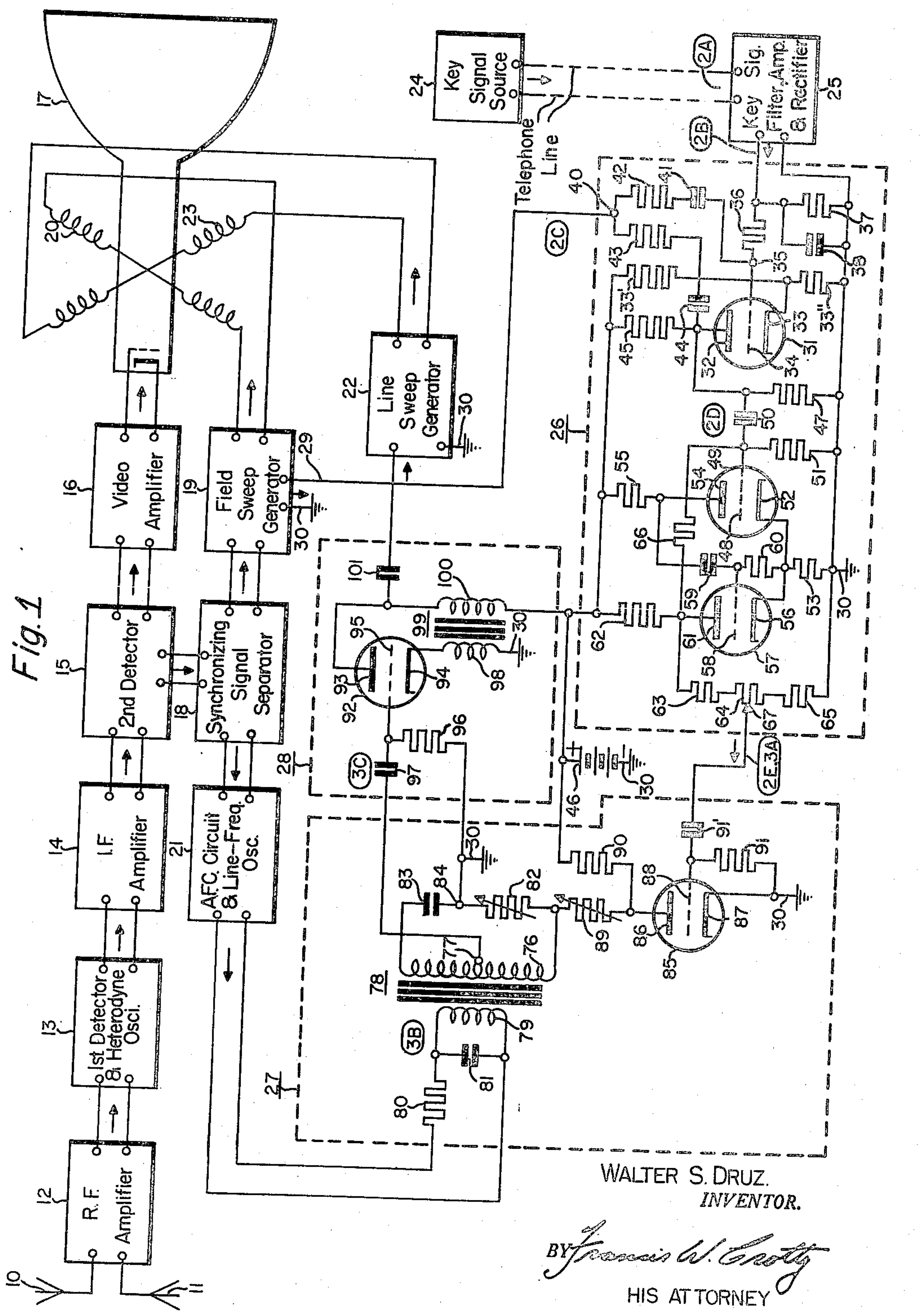

This invention relates to a novel timing system for a subscription type television receiver and more particularly to such a system adapted to alter the time relation between designated components of a received composite signal in response to a key signal. Although the invention is useful in various environments, it is especially suited for incorporation in certain types of subscription television apparatus and will be described in that connection.

Subscription television systems transmit a coded signal which can be decoded by authorized subscribers and which is substantially unintelligible to non-authorized parties. Patent No. 2,510,046 issued on May 30, 1950 in the name of Alexander Ellett et al., for "Radio-Wire Signalling System" and Patent No. 2,547,598 issued on April 3, 1951 in the name of Erwin M. Roschke, for "Image Transmission System," both of which are assigned to the same assignee as the present application, specifically disclose certain types of subscription television transmitting and receiving apparatus for accomplishing this result. The Ellett et al. patent is directed to a system in which the television signal is transmitted in coded form over one channel and a key signal is supplied over another channel to subscribers' receivers to effect decoding of the transmitted signal. The Roschke patent is directed to a similar system in which coding of the television signal is accomplished by varying the time relation between the video-signal components and the synchronizing-signal components recurrently between two different modes or conditions while the key signal indicates the instantaneous mode of the coded television signal.

For proper decoding of a signal which is coded in keeping with the Roschke system, authorized receivers should be provided with the means for altering the time relation between the synchronizing-signal components and the video-signal components of the received composite signal. For example, consider this form of coding as applied to a composite signal in which synchronizing information is represented by regularly recurring pulses while the video information occurs during the intervals between successive synchronizing pulses. Coding is accomplished by altering the time relation of the video information relative to these pulses while maintaining a substantially constant pulse repetition rate. A key signal, which represents the coding schedule, that is, the pattern in accordance with which the timing of the signal components is varied, is made available to authorized subscribers, usually via a closed wire circuit. This key signal controls the operation of decoding apparatus at each subscriber's receiver to permit intelligent image reproduction in response to the radiated but coded television signal. In non-subscriber receivers each of the successive line-trace intervals of the reproducing device is initiated in response to one of the synchronizing pulses but the video information appears at varying positions along the traces each time the video-synchronizing time relation is varied. Hence, a distorted image is produced and reception is unintelligible.

It is an object of this invention, therefore, to provide a novel timing system for a subscription type television receiver.

Another object of this invention is to provide, in a receiver adapted to respond conjointly to a coded composite television signal and a key signal, a novel timing system for altering the time relations between the video and synchronizing components of the received television signal in accordance with a coding schedule represented by the key signal.

In accordance with the invention, the timing system is adapted for inclusion in a subscription type television receiver which utilizes a coded television signal composed of video and synchronizing-signal components the timing of which, relative to each other, is altered according to a coding schedule. The subscription signal may be accompanied by a key signal representative of that coding schedule. The timing system compensates the altered timing of the television signal in response to this key signal and comprises a center-tapped impedance element and a network for developing a signal of sinusoidal waveform tuned by the synchronizing-signal components of the coded television signal. Means are provided for applying the sinusoidal signal to the impedance element. A series network is paralleled with the impedance element and includes a resistive portion and a reactive portion. An output circuit for the timing system includes the center-tap of the impedance element and the junction between the portions of the series network. In the output circuit there is derived a signal which has a phase relation with the synchronizing-signal components that is determined by the relative impedance values of the series network portions. The timing system further includes a relay device which has a controlled circuit included in one of the portions of the series network and a control circuit responsive to the key signal for altering the impedance value of this portion of the series network to vary selectively the phase relations between the synchronizing-signal components of the coded television signal and the signal derived in the output circuit of the timer in accordance with the coding schedule. The system includes means for applying the key signal to the control circuit.

Figure 2:
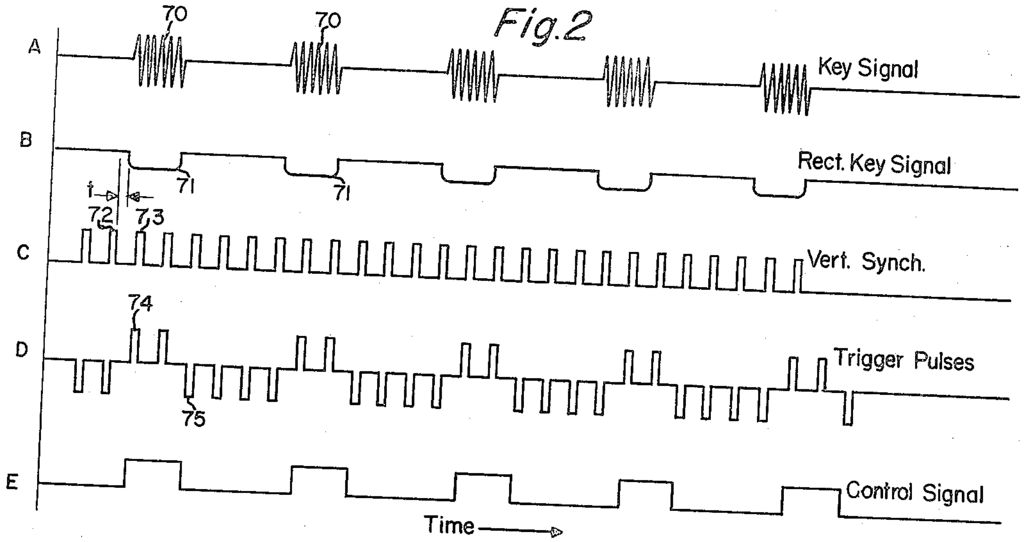
Figure 3:
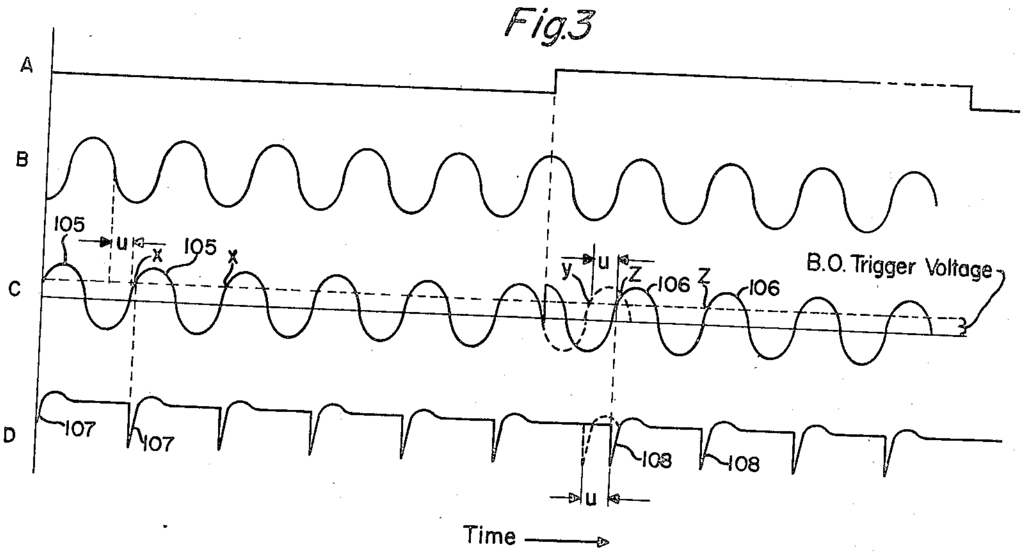

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Fig. 1 is a circuit diagram, partly schematic, of a television receiver including a timing system embodying the present invention; and Figs. 2 and 3 comprise graphs utilized in explaining the operation of certain components represented in Fig. 1.

Referring to Fig. 1, the receiver there shown comprises, in cascade, an antenna-ground circuit 10, 11, a radio-frequency amplifier 12 of one or more stages, an oscillator-modulator 13, an intermediate-frequency amplifier 14 of one or more stages, a second detector 15, and a video-frequency amplifier 16 of any desired number of stages connected to the control electrode-cathode circuit of a television picture tube 17. The detector 15 is also connected to a synchronizing-signal separator 18 which is coupled on the one hand to a field-sweep generator 19, in turn coupled to a pair of field-deflection coils 20 of picture tube 17, and on the other hand to an automatic-frequency-control circuit and line-frequency oscillator 21 which is coupled through decoding apparatus to be described hereinafter to a line-sweep generator 22. This generator is coupled to a pair of line-sweep deflection coils 23 of picture tube 17.

A key-signal source 24, which is usually located at some central exchange remote from the receiver installation, is coupled over a wire circuit, such as a telephone line, to a key-signal filter, amplifier and rectifier stage 25 in turn coupled to a decoding signal generator 26. Generator 26 is coupled to a timing system 27 constructed in accordance with the invention and coupled to a blocking oscillator 28. Field-sweep generator 19 is coupled to control circuit 26 by means of a lead 29 and ground 30. All of the components of the receiver with the exception of the decoding apparatus 25—28 may be of any conventional construction.

Neglecting for the moment the operation of the decoding apparatus 25—28, the circuit above described comprises, in general a conventional television receiver. The operation of such a receiver is well understood so that a detailed description thereof is unnecessary. In brief, however, a signal intercepted by antenna-ground circuit 10, 11 is selected and amplified in radio-frequency amplifier 12 and applied to oscillator demodulator 13, wherein it is converted into an intermediate-frequency signal. The intermediate-frequency signal is amplified in stage 14 and is supplied to detector 15, wherein the video-frequency signal components and the synchronizing-signal components are derived.

The video intelligence from detector 15 is amplified in stage 16 and is impressed on the control electrode-cathode circuit of reproducing device 17 to control the intensity of the cathode-ray beam in this device. Also, from stage 15 the composite detected signal is supplied to separator 18, which separates the line- and field-synchronizing components from the video information, the field components being supplied to generator 19 which produces a synchronized deflection signal in coils 20 for deflecting the cathode ray beam within tube 17.

The separated line-synchronizing components are supplied to stage 21, wherein there is developed an automatic-frequency-controlled signal that is synchronized therewith and this signal is supplied through stage 27 of the decoding apparatus to oscillator 28. The signal from stage 28 controls generator 22, and a synchronized line-sweep signal is supplied by generator 22 to coils 23 of picture tube 17 to develop a deflection field timed in accordance with line-synchronizing signals. Thus, as the cathode-ray beam of picture tube 17 is caused to scan in synchronism with the synchronizing signals, the intensity of the beam is modulated by signals from amplifier 16 and an image is produced on the viewing screen of device 17. The apparatus required at the receiver to reproduce the accompanying sound-signal component of the received television signal forms no part of the present invention and is not shown.

Decoding signal generator 26 includes an electron-discharge device 31 comprised of an anode 32, a cathode 33 and a control electrode 34. The output circuit of stage 25 is connected to ground 30 and to a terminal 35 through a resistor 36, control grid 34 also being connected to terminal 35. The connection between stage 25 and resistor 36 is connected to ground through the parallel combination of a resistor 37 and a condenser 38. Terminal 35 is connected to another terminal 40 through a series-connected condenser 41 and resistor 42. Terminal 40 is connected to generator 19 by way of lead 29 and to anode 32 through a series combination of a resistor 43 and a condenser 44. The anode 32 is connected through a resistor 45 to the positive terminal of a B-supply source 46, the negative terminal of which is grounded at 30. A connection to ground 30 is provided for anode 32 through a resistor 47. The cathode 33 is connected to a voltage divider including the series resistors 33′ and 33′′ which are connected between the positive terminal of source 46 and ground 30.

The anode 32 of device 31 is coupled to the control electrode 48 of an electron-discharge device 49 through a condenser 50, this control electrode being connected to ground through a grid leak resistor 51. The cathode 52 of device 49 is grounded through a biasing resistor 53, and the anode 54 of this device is connected to the positive terminal of source 46 through a load resistor 55. The cathode 52 of tube 49 is directly connected to the cathode 56 of a discharge device 57, and anode 54 of device 49 is coupled to the control electrode 58 of device 57 through a coupling condenser 59, the control electrode 58 being connected to cathode 56 through a resistor 60. The anode 61 of device 57 is connected to the positive terminal of source 46 through a load resistor 62 and this anode is connected to ground through series-connected resistors 63, 64 and 65. The junction of anode 61 of device 57 and resistor 63 is connected to control electrode 48 of device 49 through a resistor 66. A variable tap 67 on resistor 64 and ground 30 constitute the output terminals of stage 26.

The operation of stages 24, 25 and 26 may best be understood by reference to Fig. 2. Bursts of key signal, such as are indicated by curve 2A, are received from source 24 over the circuit here shown as a telephone line and are supplied to stage 25. These bursts indicate the intervals during which the timing of the video-signal components of the received subscription television signal is altered with respect to the synchronizing-signal components thereof. As pointed out in the afore-mentioned Roschke patent, the changes from the normal mode to the altered mode of transmission of the subscription signal are effected at the transmitter preferably during vertical retrace intervals in order to avoid distortion of the television image which may occur if such changes are made during trace intervals. As also pointed out in the Roschke patent, each burst of key signal is preferably transmitted over the line circuit one field period before the corresponding change in mode is effected to allow for delays that may occur in the line circuit. The decoding apparatus at the receiver should be arranged to receive these bursts and enable the vertical-synchronizing pulse succeeding the start of each burst to actuate the decoding apparatus from a first to a second condition, while the vertical-synchronizing pulse succeeding the termination of each burst actuates the decoding apparatus from the second condition back to the first condition. In such manner, compensating changes at the receiver occur simultaneously with mode changes of the received subscription signal.

The bursts of key signal shown in curve 2A, individually designated 70, are selected, amplified and rectified by stage 25. This stage may include conventional filter, amplifier and rectifier sections, or, more specifically, may be similar to the circuit disclosed in the copending application of Albert Cotsworth III et al., Serial No. 79,432, filed March 3, 1949, for "Decoding Apparatus for Television Receivers," now Patent No. 2,632,799, issued March 24, 1953, and assigned to the same assignee as the present application. The rectified bursts of key signal, designated 71 in Fig. 2B, are supplied with negative polarity to the control grid-cathode circuit of device 31 in stage 26. The vertical-synchronizing pulses derived from field-sweep generator 19, represented in curve 2C, are impressed between terminal 40 and ground 30. The burst 70 of key signal shown in curve 2A is initiated at the transmitter by a vertical synchronizing pulse corresponding to the pulse 72 in curve 2C. Due to the possibilities of a time delay occurring in the line circuit between source 24 and stage 25, the burst 70, when received by the receiver, may have shifted in time relative to the initiating pulse 72 which is received via the ether. This shift is represented by the time interval $t$. However, as previously stated, the key-signal bursts are transmitted a field period before a change is made in the transmitted signal from one mode to the other. Hence, such change in mode is made at the transmitter by the vertical synchronizing pulse 73 succeeding the pulse 72, in Fig. 2C. Therefore, the decoding apparatus at the receiver is arranged to be actuated by this same vertical-synchronizing pulse 73 to compensate for changes in mode of the received signal.

To this end, the rectified negative-polarity bursts 71 are impressed on control electrode 34 of device 31, and the positive-polarity vertical-synchronizing pulses from generator 19 are also impressed on this control electrode. The device 31 has an amplification factor of 2, and it is biased to cut off in the presence of each rectified burst of key signal. In the intervals between the rectified bursts of key signal, device 31 is conductive and the positive-polarity vertical-synchronizing pulses applied to control electrode 34 are amplified by this device and supplied to control electrode 48 of the device 49 as negative-polarity pulses having two times their original amplitude. However, the positive-polarity vertical pulses are continuously supplied to device 49 through the series combination of resistor 43 and condenser 44. Consequently, the net result is that pulses are supplied to control electrode 48 of device 49 which change polarity after the initiation and after the termination of each rectified burst of key signal, these pulses being shown by the curve 2D. In other words, in the presence of a rectified key signal device 31 is non-conductive and field-synchronizing pulses of a given amplitude and positive polarity are applied to control electrode 48 through resistor 43 and condenser 44. On the other hand, in the absence of a key signal device 31 is conductive concurrently to supply negative-polarity field-synchronizing pulses to electrode 48. The net pulse impressed on control electrode 48 for this condition is of negative polarity and the same amplitude as the pulses applied thereto for the first-described condition.

The discharge devices 49 and 57 constitute a single-shot multivibrator. Assuming that in the initial state of the multivibrator device 57 is conductive and device 49 is non-conductive, this condition is maintained until a positive-polarity pulse, such as pulse 74, is received to trip the multivibrator into its second state. Positive pulses immediately succeeding pulse 74 have no effect on the multivibrator, but the next negative pulse, such as pulse 75 of curve 2D, returns the multivibrator to its initial state. As a result, a control signal, shown in curve 2E, is derived in the output circuit of stage 26, the amplitude of this signal being adjustable by means of tap 67. This signal has amplitude changes determined by the vertical-synchronizing pulses immediately succeeding the initiation and termination of the individual bursts of key signal received by stage 25, and hence the amplitude changes of the control signal from maximum to minimum and vice versa occur in synchronism with mode changes of the received subscription television signal. The circuit just described is also shown in the afore-mentioned Cotsworth application.

Referring now more particularly to the circuit embodying the present invention for the purpose of compensating the altered timing between the video and synchronizing-signal components of a coded television signal, the timing system comprises an impedance element 76 provided with a center-tap 77 and constituting the secondary winding of a transformer 78, the primary winding 79 of which is coupled to the output circuit of stage 21 through a series-resistor 80. A condenser 81, connected in parallel with winding 79, tunes the winding to the frequency of the line-signal component of the composite television signal. A series network is paralleled with element 76 and includes a resistor 82 and a reactance here shown as a condenser 83. The output circuit of system 27 includes the center-tap 77 of element 76 and the junction 84 between portions 82 and 83 of the series network.

System 27 further includes an electron-discharge or relay device 85 comprised of an anode 86, a cathode 87 and a control electrode 88. The anode 86 is connected to the junction of winding 76 of transformer 78 and resistor 82 through a variable resistor 89 and cathode 87 is connected to ground 30. Thus, the anode-cathode or controlled circuit of device 85 is included as a parallel branch in the resistive portion of the series network 82—83. The anode 86 further is connected through a resistor 90 to the positive terminal of source 46, and a resistor 91 is connected between control grid 88 and ground 30. A coupling condenser 91′ couples tap 67 of resistor 64 in stage 26 to control grid 88.

The output circuit of system 27 is coupled to blocking oscillator 28 which includes an electron-discharge device 92 having an anode 93, a cathode 94 and a control electrode 95. The control electrode 95 is connected through grid resistor 96 to ground 30 and also to center-tap 77 through a coupling condenser 97. The cathode 94 is connected to ground 30 through one winding 98 of blocking transformer 99, another winding 100 of which is connected between anode 93 and the positive terminal of source 46. The anode circuit of device 92 is coupled to generator 22 through a coupling condenser 101.

The operation of portions 27 and 28 of the decoding apparatus may best be understood by reference to Fig. 3. The curve 3A represents the curve 2E on an expanded time scale and shows the control signal or decoding signal impressed on the control circuit of relay 85 in stage 27 from the potentiometer 64 included in the output circuit of multivibrator 48, 57. The output signal from the line-frequency oscillator 21 is applied to primary winding 79 of transformer 78 and has a sinusoidal wave form shown by the curve 3B. If the oscillator 21 produces an output signal of pulse wave form, resonant circuit 79, 81 nevertheless develops the sinusoidal signal of curve 3B. In any case, resistor 80 prevents the output circuit of stage 21 from unduly loading the tuned circuit 79, 81. The sinusoidal signal in primary winding 79 induces a similar current in secondary 76 and the secondary signal is impressed across the series network 82—83.

Let it be assumed for the moment that device 85 represents an infinite impedance in parallel with resistor 82. Then, in response to the signal voltage on network 82—83, represented by curve 3B, a signal of sinusoidal form appears in the output circuit of system 27 with a phase determined by the relative impedance values of elements 82 and 83, which may be considered as comprising a phase shifting network. The phase of the output signal may be altered by varying the actual impedance of element 82 or by changing its effective impedance. This is accomplished by means of shunting relay device 85, the internal impedance of which is dependent upon the voltage impressed on its control grid-cathode circuit. As pointed out above, the control signal of Fig. 3A is supplied to the input circuit of device 85 and hence the impedance value of the resistive branch of network 82—83 is varied in accordance with the output signal of stage 26. The resistances of elements 82 and 89 are adjusted so that the phase change from the delayed condition to the undelayed condition provides the requisite change in timing.

When the control signal applied to device 85 is negative, the signal applied to blocking oscillator 28 is represented by the sinusoidal alterations 105 of Fig. 30, delayed from the signal of waveform 3B by a time interval $u$. When the control signal is positive, the time delay is altered and the signal applied to stage 28 now appears as represented by the waveform 106. The blocking oscillator 28 is of the "free running" variety and is synchronized by the signal supplied thereto from stage 27. As is well known, synchronization of a blocking oscillator occurs at an input signal voltage of predetermined magnitude, which is represented by the horizontal dash line in Fig. 3C. Since the signal voltage applied to the blocking oscillator is of constant peak amplitude and of varying phase, the oscillator is triggered at time intervals which depend only on the timing of the applied signal. The oscillator fires at times $x$ in one mode of operation and, with reference to the dash extension of sine wave 105, would fire at time $y$ but for the mode change which shifts the timing of the wave 2C to the condition designated 106. Hence, in the altered mode, the oscillator fires at times $z$ which are displaced in phase from the times $x$ by a time interval $u$. As seen in curve 3D, which shows the signal supplied to sweep generator 22 from the output circuit of oscillator 28, during the occurrence of firing times $x$ in one mode of operation, negative pulses 107 synchronize line generator 22, and, during the other mode or $y$ condition, pulses 108 synchronize the generator 22.

The timing of the pulses applied to generator 22 thus is changed each time the mode of transmission of the television signal is changed, and, therefore, the timing of the horizontal scanning of image tube 17 is altered in synchronism with the mode changes. The arrangement is such that the timing of the horizontal scanning is altered in the correct amount and in the appropriate sense to compensate for changes in mode of the received subscription signal to enable the image tube to reproduce an undistorted image from this signal. Consequently, the invention provides a novel timing system for enabling a television receiver to decode and reproduce a subscription type television signal in which the timing between components constituting the signal is altered during spaced operating intervals.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a subscription type television receiver for utilizing a coded subscription television signal including video and synchronizing-signal components the timing of which, relative to each other, is altered in accordance with a coding schedule and for concurrently utilizing a key signal representing said coding schedule, a system for compensating the alterations in timing comprising: a center-tapped impedance element; a network for developing a signal of sinusoidal wave form timed by said synchronizing signal components; means for applying said sinusoidal signal to said impedance element; a series network paralleled with said impedance element and including a resistive portion and a reactive portion; an output circuit for said system including the center-tap of said impedance element and the junction between said portions of said series network for deriving an output signal having a phase relation with said synchronizing-signal components determined by the relative impedance values of said portions; a relay device having a controlled circuit included in one of said portions of said series network and a control circuit responsive to said key signal for altering the impedance value of said one portion selectively to vary the phase relations between said synchronizing-signal components and said derived signal in accordance with said coding schedule; and means for applying said key signal to said control circuit.

2. In a subscription type television receiver for utilizing a coded subscription television signal including video and synchronizing-signal components the timing of which, relative to each other, is altered in accordance with a coding schedule and for concurrently utilizing a key signal representing said coding schedule, a system for compensating the alterations in timing comprising: a center-tapped impedance element; a network for developing a signal of sinusodial wave form timed by said synchronizing signal components; means for applying said sinusodial signal to said impedance element; a series network paralleled with said impedance element and including a resistive portion and a capacitive portion; an output circuit for said system including the center-tap of said impedance element and the junction between said portions of said series network for deriving a signal having a phase relation with said synchronizing-signal components determined by the relative impedance values of said portions; a relay device having a controlled circuit included in said resistive portion of said series network and a control circuit responsive to said key signal for altering the impedance value of said one portion to vary selectively the phase relations between said synchronizing signal components and said derived signal in accordance with said coding schedule; and means for applying said key signal to said control circuit.

3. In a subscription type television receiver for utilizing a coded subscription television signal including video and synchronizing signal components the timing of which, relative to each other, is altered in accordance with a coding schedule and for concurrently utilizing a key signal representing said coding schedule, a system for compensating the alterations in timing comprising: a center-tapped impedance element; a network for developing a signal of sinusoidal wave form timed by said synchronizing-signal components; means for applying said sinusoidal signal to said impedance element; a series network paralleled with said impedance element and including a resistive portion and a reactive portion; an output circuit for said system including the center-tap of said impedance element and the junction between said portions of said series network for deriving a signal having a phase relation with said synchronizng signal components determined by the relative impedance values of said portions; an electron-discharge device having an anode, a cathode and a control electrode; an anode-cathode circuit for said device included in one of said portions of said series network; a control electrode-cathode circuit for said device responsive to said key signal for altering the impedance value of said one portion of said series network to vary selectively the phase relations between said synchronizing signal components and said derived signal in accordance with said coding schedule; and means for applying said key signal to said control circuit.

4. In a subscription type television receiver for utilizing a coded subscription television signal including video and synchronizing signal components the timing of which, relative to each other, is altered in accordance with a coding schedule and for concurrently utilizing a key signal representing said coding schedule, a timing system for compensating the alterations in timing comprising: a center-tapped impedance element; a network for developing a signal of sinusodial wave form timed by said synchronizing signal components; means for applying said sinusodial signal to said impedance element; a series network paralleled with said impedance element and including a resistive portion and a reactive portion; an output circuit for said system including the center-tap of said impedance element and the junction between said portions of said series network for deriving a signal having a phase relation with said synchronizing-signal components determined by the relative impedance values of said portions; an electron-discharge device having an anode, a cathode and a control electrode; an anode-cathode circuit for said device connected in parallel with one of said portions of said series network; a control electrode-cathode circuit for said device responsive to said key signal for altering the impedance value of said one portion of said series network selectively to vary the phase relations between said synchronizing-signal components and said derived signal in accordance with said coding schedule; and means for applying said key signal to said control circuit.

WALTER S. DRUZ.

References Cited in the file of this patent

UNITED STATES PATENTS

| Number | Name | Date |
|---|---|---|
| 1,950,406 | Hoorn | Mar. 13, 1934 |
| 2,318,934 | Evans | May 11, 1943 |
| 2,408,193 | Beste | Sept. 24, 1946 |
| 2,414,475 | Marchand | Jan. 21, 1947 |
| 2,547,598 | Roschke | Apr. 3, 1951 |
| 2,572,853 | Gray | Oct. 30, 1951 |